(12) United States Patent
Vishik et al.

(10) Patent No.: US 8,203,452 B2
(45) Date of Patent: Jun. 19, 2012

(54) INTELLIGENT RFID INFORMATION MANAGEMENT SYSTEM

(75) Inventors: Claire Svetlana Vishik, Austin, TX (US); G. Neelakantan Kartha, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 12/469,185

(22) Filed: May 20, 2009

(65) Prior Publication Data

US 2009/0224891 A1    Sep. 10, 2009

Related U.S. Application Data

(63) Continuation of application No. 11/026,531, filed on Dec. 30, 2004, now Pat. No. 7,551,082.

(51) Int. Cl.
*G08B 13/14* (2006.01)
(52) U.S. Cl. ............ 340/572.1; 340/572.4; 340/825.69; 340/825.72; 340/10.1; 340/10.3; 340/10.42
(58) Field of Classification Search .......... 340/572.1, 340/572.4, 10.1, 10.3, 10.41, 10.42, 825.69, 340/572.3, 825.72, 10.4; 235/375, 376, 383, 235/385; 705/1, 23
See application file for complete search history.

(56) References Cited

U.S. PATENT DOCUMENTS

| | | | |
|---|---|---|---|
| 6,509,828 B2 | 1/2003 | Bolavage et al. | |
| 6,804,578 B1 * | 10/2004 | Ghaffari | 700/229 |
| 6,869,021 B2 * | 3/2005 | Foth et al. | 235/492 |
| 7,021,535 B2 * | 4/2006 | Overhultz et al. | 235/382 |
| 7,035,856 B1 * | 4/2006 | Morimoto | 705/7.12 |
| 2002/0062254 A1 * | 5/2002 | Matsko | 705/20 |
| 2002/0185532 A1 | 12/2002 | Berquist et al. | |
| 2003/0083890 A1 * | 5/2003 | Duncan et al. | 705/1 |
| 2003/0229543 A1 * | 12/2003 | Zimmerman et al. | 705/26 |
| 2004/0172537 A1 * | 9/2004 | Baus et al. | 713/170 |
| 2004/0220845 A1 * | 11/2004 | Malapitan | 705/8 |
| 2005/0165784 A1 * | 7/2005 | Gomez et al. | 707/9 |
| 2005/0218218 A1 * | 10/2005 | Koster | 235/383 |

* cited by examiner

*Primary Examiner* — Hung T. Nguyen
(74) *Attorney, Agent, or Firm* — Toler Law Group, PC

(57) ABSTRACT

A system and method are disclosed. In a particular embodiment, the system includes a repository configured to store information comprising classification components. The information is received from a plurality of locations where the information is captured from one or more radio frequency identification (RFID) tags at each of the plurality of locations. Each of the one or more RFID tags is associated with at least one item. The repository is also configured to store market data comprising at least one geographic restriction associated with the at least one item.

20 Claims, 3 Drawing Sheets

INTELLIGENT RFID INFORMATION MANAGEMENT SYSTEM

CLAIM OF PRIORITY

The present application claims priority from and is a continuation of patent application Ser. No. 11/026,531 U.S. Pat. No. 7,551,082, filed on Dec. 30, 2004 and entitled "INTELLIGENT RFID INFORMATION MANAGEMENT SYSTEM," the contents of which are expressly incorporated herein by reference in their entirety.

FIELD OF THE DISCLOSURE

The present disclosure relates to information management and in particular to methods, systems, and devices for the automatic capture and management of RFID tag information.

BACKGROUND

Automatic identification (auto ID), or automatic information capture, is the broad term that refers to a cluster of technologies that help machines identify objects. Auto identification is often coupled with automatic data capture. That is, to identify items, one has to capture information about them and somehow get the data into a computer database or other digital form without anyone having to type the information in manually.

The aim of most auto-ID systems is to increase efficiency, reduce data entry errors, and to liberate people to perform more value-added functions, such as providing customer service. There are a host of technologies related to auto-identification. These include bar codes, smart cards, voice recognition, certain biometric technologies (retinal scans, for example), optical character recognition, and radio frequency identification (RFID).

Radio frequency identification (RFID) is a generic term for technologies that use radio waves to automatically identify people or objects. There are several methods of identification, but the most common is to store a serial number that identifies a person or object, and perhaps other information, on a microchip that is attached to an antenna. The microchip and the antenna together are called an RFID transponder or an RFID tag. The antenna enables the microchip to transmit the identification information to a reader. The reader converts the radio waves reflected back from the RFID tag into digital information that can then be passed on to computers that can make use of it.

Radio frequency identification first appeared in tracking and access applications during the 1980s. These wireless systems allow for non-contact reading. RFID is used for everything from tracking cows and pets to triggering equipment down oil wells. The most common applications are tracking goods in the supply chain, reusable containers, high value tools and other assets, and parts moving to a manufacturing production line or tracking moving targets such as registered cars on toll roads. RFID is also used for security, such as controlling access to buildings and networks. It is also used in payment systems based on contactless smart cards that let customers pay for items without using cash.

RFID has become an important technology with applications in many areas, from inventory control to distribution of controlled goods (e.g. medication) and access to toll roads. Inventory control and management is one of the most active fields of applications. Most systems being developed, however, are for the capture rather than management of information. RFID information management systems under development typically don't take advantage of near real-time access to up-to-date information and context.

RFID applications may not bring significant improvement in the product management, supply chain, and inventory systems. For example, RFID capture and management systems used to govern the distribution of medicines merely capture the number in the RFID tag and are capable of blocking that number for confidentiality and privacy reasons. However, RFID offers an opportunity to take almost real-time snapshots of the inventory, movement, shipping, distribution, replacement, and other uses of products, describing a concrete market in minute detail and permitting vendors to react immediately and effectively to changes in demand.

BRIEF DESCRIPTION OF THE DRAWINGS

The present invention is further described in the detailed description that follows, by reference to the noted drawings, by way of non-limiting examples of embodiments of the present invention, in which like reference numerals represent similar elements throughout several views of the drawings, and in which.

DETAILED DESCRIPTION

Figure 1:
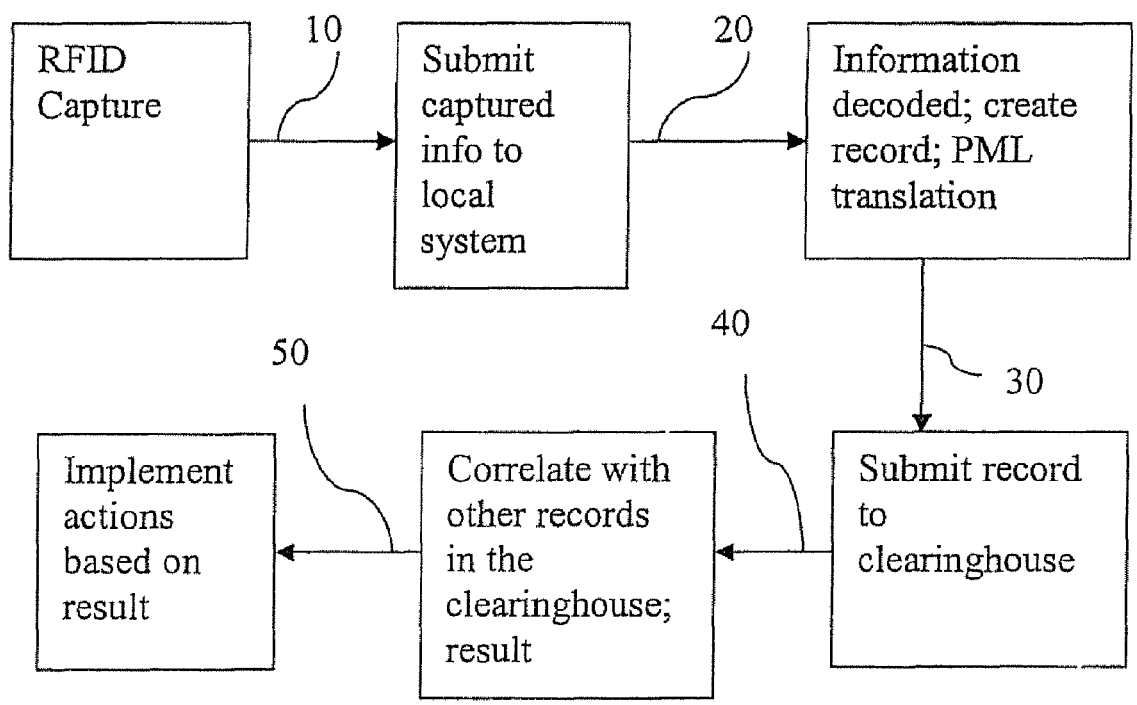
FIG. 1 is a flow diagram of a method of an exemplary specific embodiment.

In a particular embodiment, a system is disclosed that includes a repository configured to store information comprising classification components. The information is received from a plurality of locations including a first site and a second site. The information is captured from one or more radio frequency identification (RFID) tags at each of the plurality of locations. Each of the one or more RFID tags is associated with at least one item. The repository is also configured to store market data comprising at least one geographic restriction associated with the at least one item.

In another particular embodiment, an interface to a repository is disclosed. The interface may be executable by a computer. The interface may include logic to display information stored in the repository. The repository may receive the information from a plurality of locations including a first site and a second site. The information is captured from one or more radio frequency identification (RFID) tags at each of the sites. Each of the one or more RFID tags may be associated with at least one item. The information may include transactional data comprising substitute information.

In another particular embodiment, a computer-readable storage medium is disclosed. The computer-readable storage medium includes computer-executable instructions that, when executed by a computer, cause the computer to receive information. The repository may store the information received from a plurality of locations including a first site and a second site where the information is captured from one or more radio frequency identification (RFID) tags at each of the sites. Each of the one or more RFID tags may be associated with at least one item. The information may include first information associated with a first item and second information associated with a second item. The computer-readable storage medium may also include computer-executable instructions that, when executed by the computer, cause the computer to generate data related to a first classification component of the first information based on content derived from the second information associated with the second item.

In view of the foregoing, the present invention, through one or more of its various aspects, embodiments and/or specific features or sub-components, is thus intended to bring out one or more of the advantages that will be evident from the description. The present invention is described with frequent reference to RFID. It is understood, however, that RFID is merely an example of a specific embodiment of the present invention, which is directed broadly to methods and systems for automatic information capture and management. The terminology, examples, drawings and embodiments, therefore, are not intended to limit the scope of the invention.

A basic RFID system consists of three components: an antenna or coil; a transceiver (with decoder), also referred to as an interrogator or reader; and a transponder (RF tag) electronically programmed with unique information. An RFID tag typically consists of a microchip that stores the information in combination with an antenna.

The interrogator or reader, which also has an antenna, emits an electromagnetic signal. The tag antenna is tuned to receive the signal. A passive RFID tag draws power from the field created by the reader and uses it to power the microchip's circuits. The microchip then modulates the waves that the tag sends back to the reader and the reader converts the modulated waves into digital data.

RFID tags and readers are tuned to the same frequency to communicate. RFID systems use many different frequencies, but generally the most common are low—(around 125 KHz), high—(13.56 MHz) and ultra-high frequency, or UHF (850-900 MHz). Microwave (2.45 GHz) is also used in some applications. Radio waves behave differently at different frequency, so proper frequency selection for a given application is a consideration for RFID implementation.

Different frequencies have different characteristics that make them more or less useful for selected applications. For instance, low-frequency tags are less expensive than ultra high frequency (UHF) tags, use less power and are better able to penetrate non-metallic substances. They are ideal for scanning objects with high-water content, such as fruit, at close range.

UHF frequencies typically offer better range and can transfer data faster. They use more power, however, and are less likely to pass through materials. Additionally, because UHF frequencies tend to be more coherent, or focused, they require a clear path between the tag and reader. UHF tags might be better for scanning boxes of goods as they pass through a bay door into a warehouse.

RFID tags may be active or passive. Active RFID tags have a battery, which power the microchip's circuitry and broadcast signal to a reader. Passive tags have no battery. Instead, they draw power from the reader, which emits a fluxing electromagnetic field that induces a current in the tag's antenna.

Additionally, semi-passive tags use a battery to power the microchip circuitry, but communicate by drawing power from the reader. Active and semi-passive tags are useful for tracking high-value goods that need to be scanned over long ranges, such as railway cars on a track, but they are considered too expensive to put on low-cost items. Passive UHF tags, which cost under 50 cents in volumes of one million tags or more, are an attractive alternative. The read range of passive UHF tags is not as far as for active tags (typically less than 20 feet as compared to 100 feet or more for active tags). Another advantage of passive tags is that the relatively low cost makes them disposable so they can be disposed of with the product packaging.

The read range of passive tags depends on many factors: the frequency of operation, the power of the reader, and interference from metal objects or other RF devices. In general, low-frequency tags are read from one foot or less. High frequency tags are read from about three feet and UHF tags are read from 10 to 20 feet. Where longer ranges are needed, such as for tracking railway cars, active tags use batteries to boost read ranges to 300 feet or more.

Typically, a tag carries no more than 2 KB of data. This is sufficient to store basic information about the item. A simple "license plate" tag contains only a 96-bit serial number. The simple tags are less expensive to manufacture and are useful for more applications where the tag will be disposed of with the product packaging.

Microchips in RFID tags can be read-write or read-only. Read-write microchips allow an individual to add information to the tag or write over existing information when the tag is within range of a reader or interrogator. Read-write tags usually have a serial number that cannot be written over. Additional blocks of data can be used to store additional information about the items the tag is attached to.

Some read-only microchips have information stored on them during the manufacturing process. The information on such microchips cannot be changed. Other read-only tags have a serial number written to it once and that information cannot subsequently be overwritten.

One problem encountered with RFID is the signal from one reader can interfere with the signal from another reader where coverage overlaps. This is called reader collision. One way to avoid the problem is to use a technique called time division multiple access (TDMA), where the readers are instructed to read at different times, rather than trying to read at the same time. This ensures that the readers do not interfere with each other. A further complication, however, is that an RFID tag in an area where two readers overlap will be read twice. The system has to be set up, therefore, so that if one reader reads a tag another reader does not read it again.

Another problem readers have is reading many chips in the same field, so-called tag collision. Tag collision occurs when more than one microchip reflects back a signal at the same time, confusing the reader. Different vendors have developed different systems for having the tags respond to the reader one at a time. Since they can be read in milliseconds, however, it appears that all the tags are read simultaneously.

The present disclosure is broadly directed towards the use of RFIDs to mark products, e.g., parts or packaged medical supplies. Various embodiments, however, apply to other fields as well, such as user access to toll roads, buildings, or equipment. The disclosed system is concerned with RFID information capture procedures to the extent of suggesting improved RFID content to provide richer information about the objects marked and to classify newly captured entries in terms of an ontology relevant to an application. An ontology-based handling of the information supplied with RFID enables the users to add reasoning and matching capabilities to the applications using RFID for data capture. The disclosure thus provides a system architecture and software functionality to process RFID information.

FIG. 1 is a flow diagram of a method of an exemplary specific embodiment. As shown in FIG. 1, ontologically coded RFID information is captured and submitted (10) to the local system. The information is decoded (20) and a PML record is created. The record is submitted (30) to the clearinghouse for correlation (40) with other records. A result is obtained from the clearinghouse processing, and one or more actions are implemented (50) based on the result.

Broadly speaking, the system adds intelligence to RFID reading, management systems, and devices by adding the following functionalities:

1. RFID numbers are structured to support classifying and positioning the information about an object marked with the RFID within an ontology, even if the only information provided is the RFID number.

2. An ontology-based system that supports multi dimensional classification, synonymy (for instance, in the classification and geographical position of the object), and implementation of relatively complex rules as well as some reasoning capability.

3. A search engine that supports fuzzy matching of query terms to, for example, replenish and order items.

4. A clearinghouse that consolidates information from multiple warehouses and creates a consolidated inventory catalog.

5. A rules-based routing system that allows the users to optimize orders based on the system in terms of quickest delivery, highest quality, and the lowest expense or other value-added features defined by the users, such as compatibility with locally adopted standards.

In addition, the architecture of the system provides a centralized repository where data flows from local RFID capture points, e.g., warehouses, pharmacies, tollbooths, or airports. The architecture permits implementation of value-added functionality, such as product and price comparison, data marts dedicated to product groups or market segments, shipping and pricing optimization, as well as other capabilities.

Several scenarios illustrating the capabilities of various embodiments are provided below. The illustrated capabilities include fuzzy searching, SCM (supply chain management) optimization, execution monitoring, and ordering. The applications described are exemplary and are not intended to limit the scope of the invention.

Current RFID supporting systems provide harvesting and capturing of RFIDs together with primitive ways to manage the information acquired using RFID scanning. A typical application creates a record of an object with a certain RFID and submits this information to other systems if so equipped. Modern approaches to records retrieval and management, however, allow developers to support increasingly complex manipulations of information captured in connection with RFID reading and adapt it to many additional uses.

While it is attractive to capture information about the inventory in a contactless manner and match it with existing descriptions of parts, it is useful to link this information with data about similar objects, e.g., parts from other vendors or generic drugs versus their brand equivalents. It is also useful to include information about location of inventory and shipping options.

A system is thus provided that collects information from individual warehouses or similar point locations and channels the collected information into a central clearinghouse. The clearinghouse is a record management and retrieval system, based on software applications used for this purpose, such as a relational database or a data warehouse. The systems include an ontology interface that supports reasoning capabilities as well as complex rules implementation for shipping and routing optimization and a search engine supporting, among other capabilities, fuzzy matching of terms.

The rich retrieval capability in the system is supported by the composition of the RFID numbers. The RFID numbers are structured to include classification information that permits the system to identify captured information within a tree structure that includes related or similar parts, new developments and replacements. In addition to the number, the information injected from a certain warehouse or other similar location contains additions with regard to geographic location and shipping options. Information about prices, possible price ranges, price modifications, promotions and other relevant price related information is injected from other systems.

The "intelligence" of RFID harvesting systems is enhanced by structuring numbers to provide information not only about nature and origination of a part or object, but also information relating to similar or supplemental objects, constraints and limitations, enhancements, place in the classification, and so forth.

Currently, Electronic Product Code (EPC) is used to define RFID tags. In the Electronic Product Codes defined so far there are four fields, which are, in order: a version number, defining the variety of EPC among a number of possible structures; a domain manager number which is effectively a manufacturer number; an object class which is equivalent to a product number; and a serial number. This information is not rich enough to support automatic classification of objects. In addition to EPC, Physical Markup Language (PML) is utilized to define additional data that could be accessed by a sensor while reading EPCs or by other means. The goal of PML is to provide a collection of common, standardized vocabularies to represent and distribute information related to EPC Network enabled objects. PML is an XML-derivative language permitting developers the freedom to define additional language sets, but it is not semantically oriented.

To enable sophisticated automatic classification and subsequent rules-based processing of numbers, the present system upgrades the currently used codes structure and enriches it with semantically oriented elements. A model of such a number-based classification is the Dewey-Decimal library classification system, which maps numbers and letters, and their positioning in a sequence, to a hierarchical classification system, comprising both general topic classification and characteristics of the instantiated object. Such an approach enables the automatic classification of newly captured information in a more sophisticated way, pre-filling many fields and automatically activating triggers.

Figure 2:
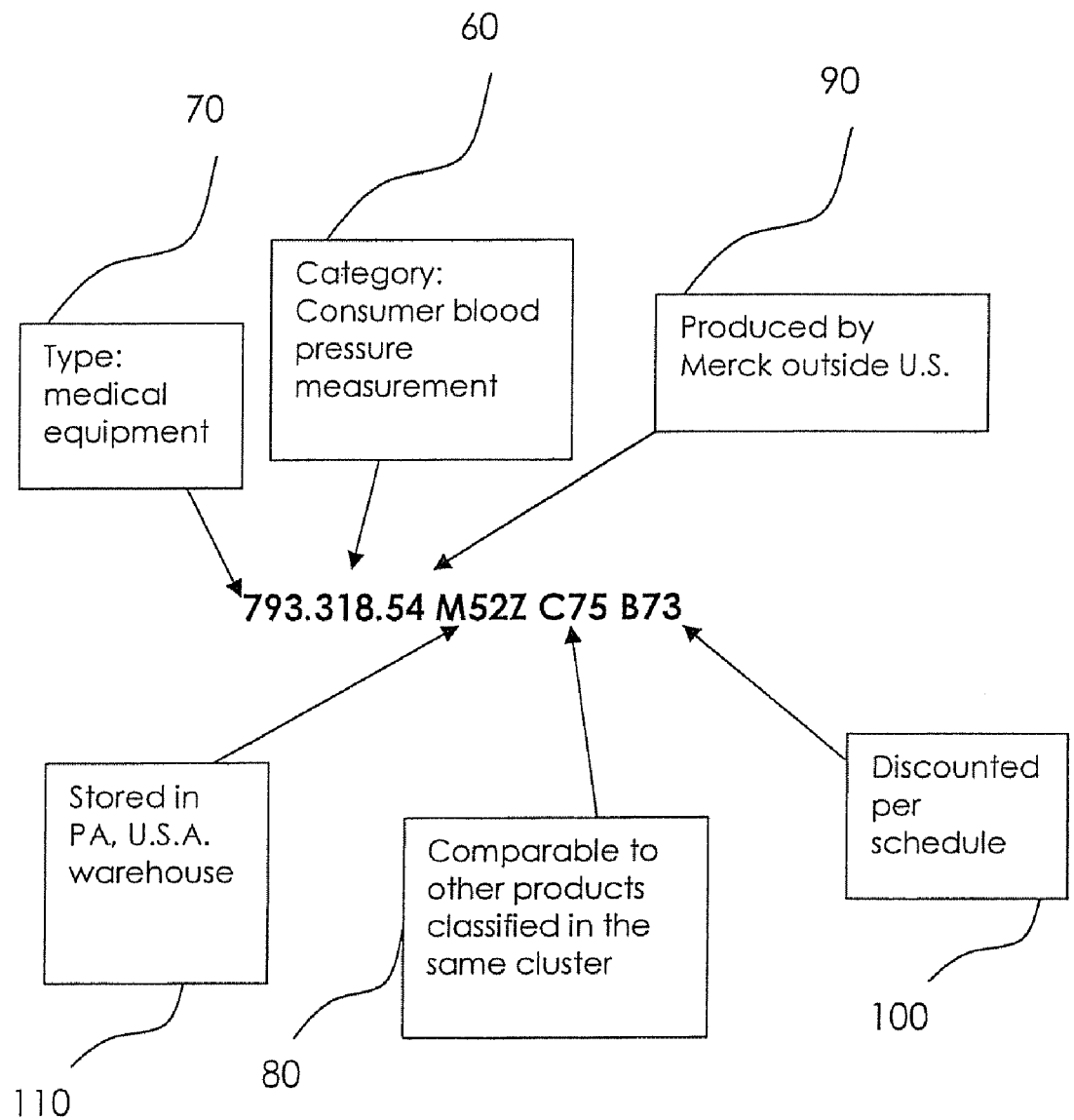
FIG. 2 is an annotated illustration of an ontological code of an exemplary specific embodiment.

FIG. 2 is an annotated illustration of an ontological code of an exemplary specific embodiment. Instead of simply adding another instance of an object identified by a number, the coded number of FIG. 2 indicates that the object in question [A] 60 is part of a class of objects [AB] 70. It is similar to object [Aa] 80 and replaceable by [Aa, Ab, and Ac]. It is not allowed in Europe where it has to be replaced by [Ab] and produced by a known set of vendors 90 under amended regular warranty, for which the terms are available. The price is falling 100 as a trend over the last 2 years in its 5th year of production. The item is overstocked in the warehouses in the US Mid-West 110, and so forth.

The components of the code constructed in the illustrated manner are automatically matched to the ontology, database schema(s), added to search indices, and supplemented with information at the local warehouse and other data when submitted to the local repository and then the centralized clearinghouse. In the process of submission, the enriched record based on the RFID code, can be translated into XML or other relevant languages to facilitate data processing.

Figure 3:
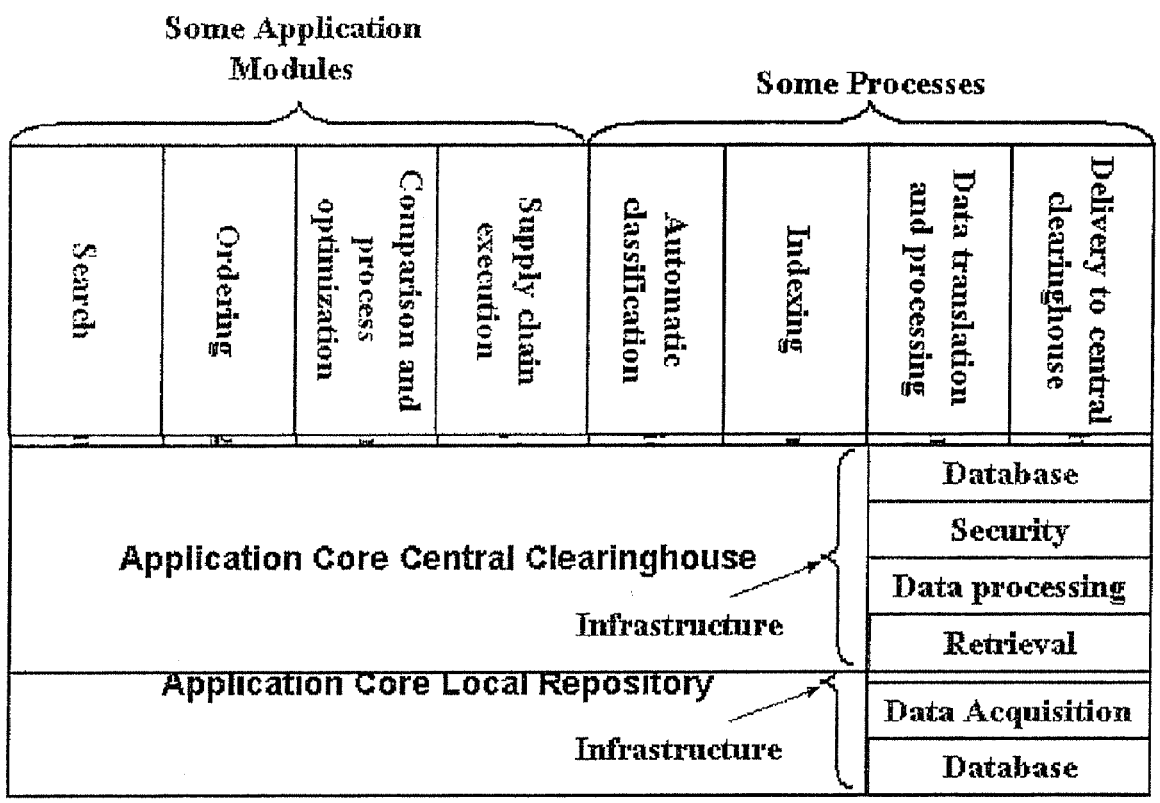
FIG. 3 is schematic diagram of a system of an exemplary specific embodiment.

FIG. 3 is a schematic diagram of a system of an exemplary specific embodiment. In particular, FIG. 3 illustrates the components of a local, specific, non-limiting, system.

The system includes, but is not necessarily limited to, the following components:

1. Local RFID systems that include RFID capture, records management, and one or more modules for pre-processing and submission to the central clearinghouse. In one embodiment, the information captured from objects equipped with RFIDs is supplemented with the information about geography, shipping options and other parameters relevant to the location in question.

The local system, such as a relational database with an attached data transformation module, has a wide range of functionality, from simply serving as a data collection, transformation, and transmission module to a fully enabled local system complete with ontology, search engine, and various application modules. The architecture assumes the consolidation of normalized data from the local systems in a central repository and implemented as a distributed system.

2. Central Clearinghouse. The information from the local system is submitted to a clearinghouse that serves as a central repository for data collected from capturing product or access codes. The submission may operate as a batch process or as near-real-time submission following processing by the local inventory and similar systems. Captured RFID data delivered directly to the central clearinghouse without prior submission to the local system is also supported either for all information or for selected records types. The central clearinghouse contains a meta-catalog of products and a variety of modules in conjunction with the catalog, ranging from catalog management to ordering and data processing.

Optional data marts contain topic/market segment specific information. The system also contains data marts, which limit the scope of the central clearinghouse. Data marts may be specialized either by a function (e.g., shipping optimization) or product category (e.g., consumer over the counter medical equipment). Data marts are subsets of the central clearinghouse and are searchable concurrently if so defined.

3. Search and Match Engine. The system supports a sophisticated search for products to allow finding products when there is no direct match between the query and the entries in the catalog. The search engine supports three types of search parameters:

1. Exact match
2. Fuzzy match
3. Based on reasoning

Exact match querying is self-explanatory: the system finds products (or other records) that exactly match the terms of the query.

Fuzzy matching is set up to support matches that have a certain percentage of common parameters with the query. The measurement of communality under this paradigm can either be flexible, with all searchable parameters taken into consideration, or defined by the users or administrators with only certain parameters made flexible and only certain thresholds allowed. This type of search is supported by the classification that links related products. It also measures the level of commonality between the products.

The third type of search, reasoning-based, is supported by the ontology associated with the system. It allows the users to perform queries that are not well defined initially and can be refined using the ontology.

4. Rule Engine. A rule engine is used after the data from the RFID readers has been cleaned and aggregated. Rule engines encode the business rules that are of importance to the organization and associate these rules with all the operations performed by the system. For instance, a rule that is important in restocking might be:

If the inventory falls below a certain level, then reorder the item. This can be encoded as a rule such as:

Current-Inventory<Level=>Trigger(ReOrderAction).

In addition to the business rules, rules dealing with data manipulation or routing can be formulated.

There are several rule engines that work with rules of the type given above. Some advantages of such a representation are:

1. Ease of use by business users
2. Ease of modification of rules to take into account new business cases.
3. Ease of implementation In addition to the business user side, rules themselves process the data, putting constraints or flags on the records or fields within them in accordance with the predefined rules. For example, a rule formulated to ensure that after the level of product A reaches a certain quantity, it is labeled "overstocked" in the system, triggers price revision, and clocks new shipments into the region in question, is enabled.

5. Ontologies. Ontologies are powerful tools that can be utilized in various ways to make use of the information captured with RFID technologies. Ontology is one of the central concepts of the knowledge representation. Typically, the word ontology refers to two things:

1. A study of the subject of the categories of things that exist or may exist in some domain. Thus ontology is the study of categories. (Cf. biology, which is the study of living things, and theology which is the study of knowledge pertaining to God).
2. The product of such a study is called an ontology.

The product of an ontological study will as a minimum come up with a type hierarchy. It may also come up with a relation hierarchy, as is the case in conceptual graph-theory. These two combined will be called an ontology.

In the present disclosure, ontology is a detailed domain definition for the trading community. It includes interrelated hierarchies of concepts in the areas of geography, inventory control, shipping, fulfillment, ordering, etc. The ontology is created prior to the knowledge capture, using one of the commonly used ontology standards, such as DAML+OIL.

In addition to the hierarchical listing of concepts, ontology describes relations among them and concepts, allowing the developers to input some reasoning and intelligence into the system. The reasoning capability can be used for pre-filling or deriving content based on information captured with RFID. For example, if the product being shipped to a warehouse is a UK standard telephone adapter, the system may pre-fill UK as a primary market and use DHL as a primary shipping company because this type of adapter is only used in the UK. It can also pre-fill the part number if it is not included in the RFID number.

Finally, the ontology will help determine alternative parts if the original part number is not available, including, for example, a reference to a multi-country telephone adapter that has a UK-specific outlet. If, on the other hand, the information captured through RFID indicates that the part is the US standard phone adapter, then the primary markets can be defined as US, Japan, Switzerland, and other countries using this standard, shipping options can be pre-filled as well, and the part number can be determined accordingly.

The ontology can also be used as a foundation for richer search and retrieval. For example, a search for "telephone adapter" will generate an additional question about the destination country and retrieved records will contain additional information that was not included in the search. In another example, if a person is looking for telephone adapters for Switzerland, he/she will be offered the standard US adapters because the record indicates that Switzerland and US are using the same standard outlet.

Examples of the uses to which ontological organization may be put include:

1. To map information obtained from PML servers to a form usable for reports. For instance, the PML server information might contain data about Coke® and Pepsi®, but for reporting, a company might need to aggregate this information under a more general category called beverages.

2. Ontologies help to classify interchangeable items. An ontology is useful, for instance, to substitute one generic napkin for another.

3. An ontology is useful to aggregate the raw RFID data into a more useful form. For instance, readers might be classified into ItemEntryReader, ItemLocationReader and so forth, so that signals from them can be classified and aggregated accordingly.

4. An ontology supports more sophisticated functions such as interactive searching, price optimization, and routing of requests and shipments.

5. An ontology can be adapted to derive information and instructions from data input in the system. For example, an ontology can contain directions to replace a part with a similar one if conditions associated with the order support such a modification.

Application Examples

1. Execution Monitoring:

a. Assume that pallets have to be shipped to and picked up at various locations in a city. The capacity of a truck is limited. By using real time data (supplied by RFID) on which pallets are shipped where, and the size of the pallets, an execution monitoring system tracks information such as (a) whether pallets were delivered on time and (b) make use of the information to determine routes for picking up and delivering packets, such that capacity constraints are obeyed.

b. Use real time data to determine whether a particular promotion for the sale of an item was successful.

2. Supply Chain Planning a. The use of real time data can affect supply chain planning in the following way: assume that initially the plan is made with forecast data: when real time data comes in, the plan is updated to reflect the new information. For this to happen a new planning paradigm, with a tight link between execution and planning, is implemented.

a. Ordering system with fuzzy matching
b. Price optimization module
c. SCM (Supply Chain Management) improvement
d. Execution monitoring
e. Automatic classification of information obtained by RFID capture The disclosure provides a system that takes full advantage of the modern approaches to data and information processing in conjunction with RFID technology. To realize potential improvements offered by RFID technology data capture and processing is improved by:

1. Novel classification system to improve data collection via RFID technologies.

2. Novel architecture channeling automatically classified data to the central repository of clearinghouse, where it is prepared for multiple applications, from product category data marts to optimized ordering.

3. The system supports multiple applications while providing potential near-real time response to changes in the marketplace to significantly improve market efficiency.

4. Specific embodiments of the system contemplate a Customer Relations Management (CRM) system in the B2B context that coordinates ordering, fulfillment, shipping, and payment by participating organizations. Trading partners can define the rules based on the preferences. For example, a trading partner can have a rule for canceling the order if fulfillment is delayed by more than a week. This rule will cause the system to exclude potential providers with a history of delays. Alternatively or additionally a trading partner can have a rule to wait until optimal pricing (defined as 10% or more off the average) is available, in which case the agent will be automatically set up to monitor the price movement for the period of time predefined in the rules.

Although the invention has been described with reference to several exemplary embodiments, it is understood that the words that have been used are words of description and illustration, rather than words of limitation. Changes may be made within the purview of the appended claims, as presently stated and as amended, without departing from the scope of the invention in all its aspects. Although the invention has been described with reference to particular embodiments, the invention is not intended to be limited to the particulars disclosed; rather, the invention extends to all functionally equivalent technologies, structures, methods and uses such as are within the scope of the appended claims.

What is claimed is:

1. A computer-readable storage medium including computer-executable instructions that, when executed by a computer, cause the computer to:
    receive an ontological code associated with an item from a repository, the ontological code including classification components associated with the item, wherein the ontological code is captured from a radio frequency identification tag associated with the item; and
    determine at least one primary shipping company for the item based on the ontological code when the item is to be shipped.

2. The computer-readable storage medium of claim 1, further comprising computer-executable instructions that, when executed by the computer, cause the computer to:
    generate data related to the at least one primary shipping company; and
    store the generated data at a clearinghouse.

3. The computer-readable storage medium of claim 2, wherein the generated data is generated and stored automatically.

4. The computer-readable storage medium of claim 2, wherein the generated data includes shipping information for the item.

5. The computer-readable storage medium of claim 4, wherein the shipping information includes shipping status information related to the item.

6. The computer-readable storage medium of claim 5, wherein the shipping status information indicates a delay in shipping of the item.

7. The computer-readable storage medium of claim 2, wherein the generated data includes an increase in price of the item.

8. The computer-readable storage medium of claim 7, wherein the generated data includes price information of a second item that is a substitute for the item.

9. The computer-readable storage medium of claim 1, further comprising a search engine that supports fuzzy matching of query terms.

10. A method comprising:
    receiving an ontological code associated with an item from a repository at a clearinghouse, the ontological code including classification components associated with the item, wherein the ontological code is captured from a radio frequency identification tag associated with the item;
    determining whether the item is to be shipped at the clearinghouse; and determining at the clearinghouse at least one primary shipping company for the item based on the ontological code when the item is to be shipped.

11. The method of claim 9, further comprising:
generating data related to the at least one primary shipping company; and
storing the generated data at the clearinghouse.

12. The method of claim 10, wherein the generated data is generated and stored automatically.

13. The method of claim 11, wherein the generated data includes shipping information for the item.

14. The method of claim 12, wherein the shipping information includes shipping status information related to the item.

15. The method of claim 13, wherein the shipping status information indicates a delay in shipping of the item.

16. The method of claim 11, wherein the generated data includes an increase in price of the item.

17. The method of claim 16, wherein the generated data includes price information of a second item that is a substitute for the item.

18. The method of claim 11, further comprising determining at least one geographic restriction that is associated with the item based on the ontological code, wherein the at least one geographic restriction identifies where the item can be sold.

19. The method of claim 18, further comprising:
generating market data based on the ontological code, wherein the market data indicates at least one trading market for the item; and
storing the generated market data at the clearinghouse.

20. The method of claim 10, further comprising a search engine that supports fuzzy matching of query terms.

* * * * *